2 Sheets—Sheet 1.

G. D. HUNTER.

Assignor, by direct and mesne assignments, of one-half to T. C. VAN NUYS and one-sixth to M. C. HUNTER.

SPARK ARRESTER.

No. 10,698. Reissued Mar. 9, 1886.

WITNESSES
F. L. Ourand,
Edwin L. Bradford.

INVENTOR
George D. Hunter.
By Courtenay Fenner
his Attorney.

N. PETERS, Photo-Lithographer, Washington, D. C.

2 Sheets—Sheet 2.

G. D. HUNTER.

Assignor, by direct and mesne assignments, of one-half to T. C. VAN NUYS and one-sixth to M. C. HUNTER.

SPARK ARRESTER.

No. 10,698. Reissued Mar. 9, 1886.

WITNESSES
F. L. Ourand,
Edwin L. Bradford

INVENTOR
George D. Hunter.
By Benjamin F. Simmons
his Attorneys

N. PETERS, Photo-Lithographer, Washington, D. C.

UNITED STATES PATENT OFFICE.

GEORGE D. HUNTER, OF TERRE HAUTE, ASSIGNOR, BY DIRECT AND MESNE ASSIGNMENTS, OF ONE-HALF TO THOMAS C. VAN NUYS AND ONE-SIXTH TO MORTON C. HUNTER, BOTH OF BLOOMINGTON, INDIANA.

SPARK-ARRESTER.

SPECIFICATION forming part of Reissued Letters Patent No. 10,698, dated March 9, 1886.

Original No. 220,922, dated October 28, 1879. Application for reissue filed August 9, 1883. Serial No. 103,342.

*To all whom it may concern:*

Be it known that I, GEORGE D. HUNTER, of Terre Haute, in the county of Vigo and State of Indiana, have invented certain new and useful Improvements in Spark-Arresters; and I do hereby declare that the following is a full, clear, and exact description of the invention, which will enable others skilled in the art to which it appertains to make and use the same, reference being had to the accompanying drawings, and to the letters of reference marked thereon, which form a part of this specification, and in which—

Figure 1:
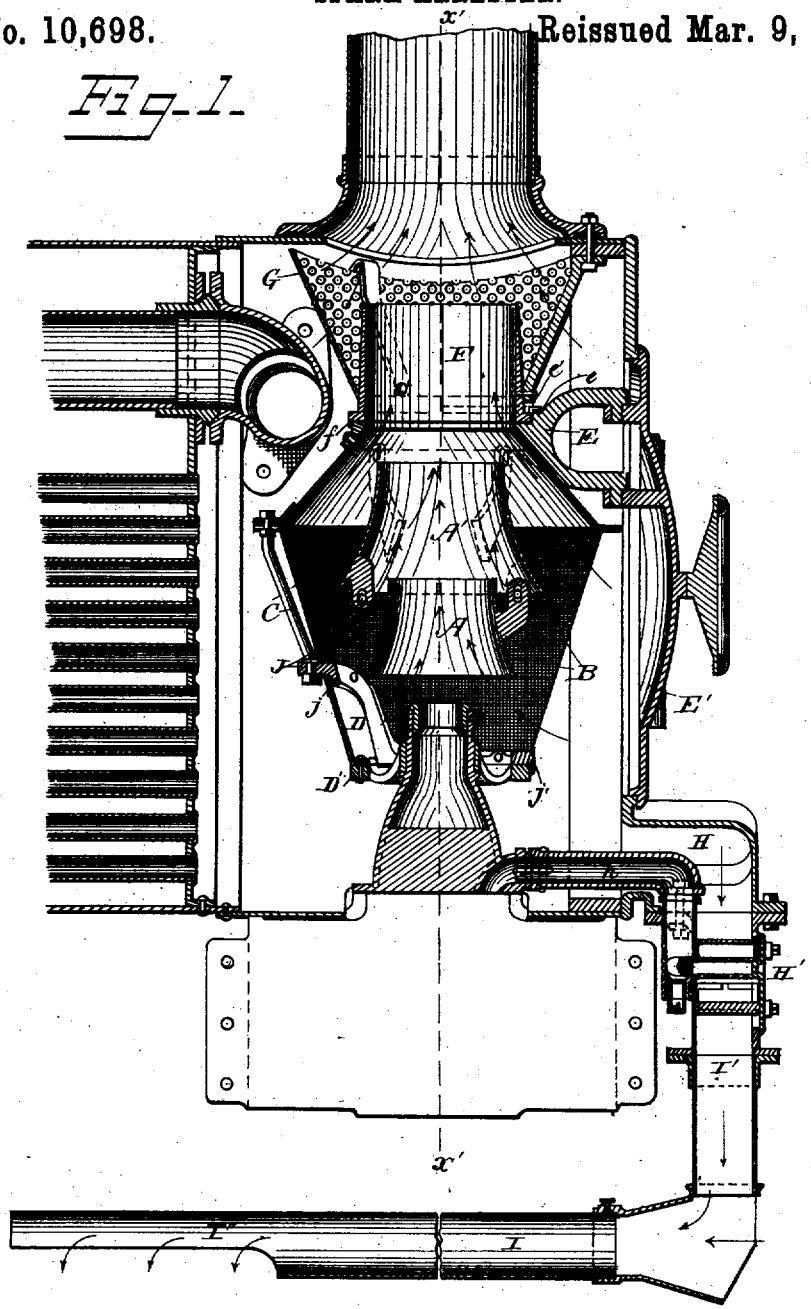
Figure 2:
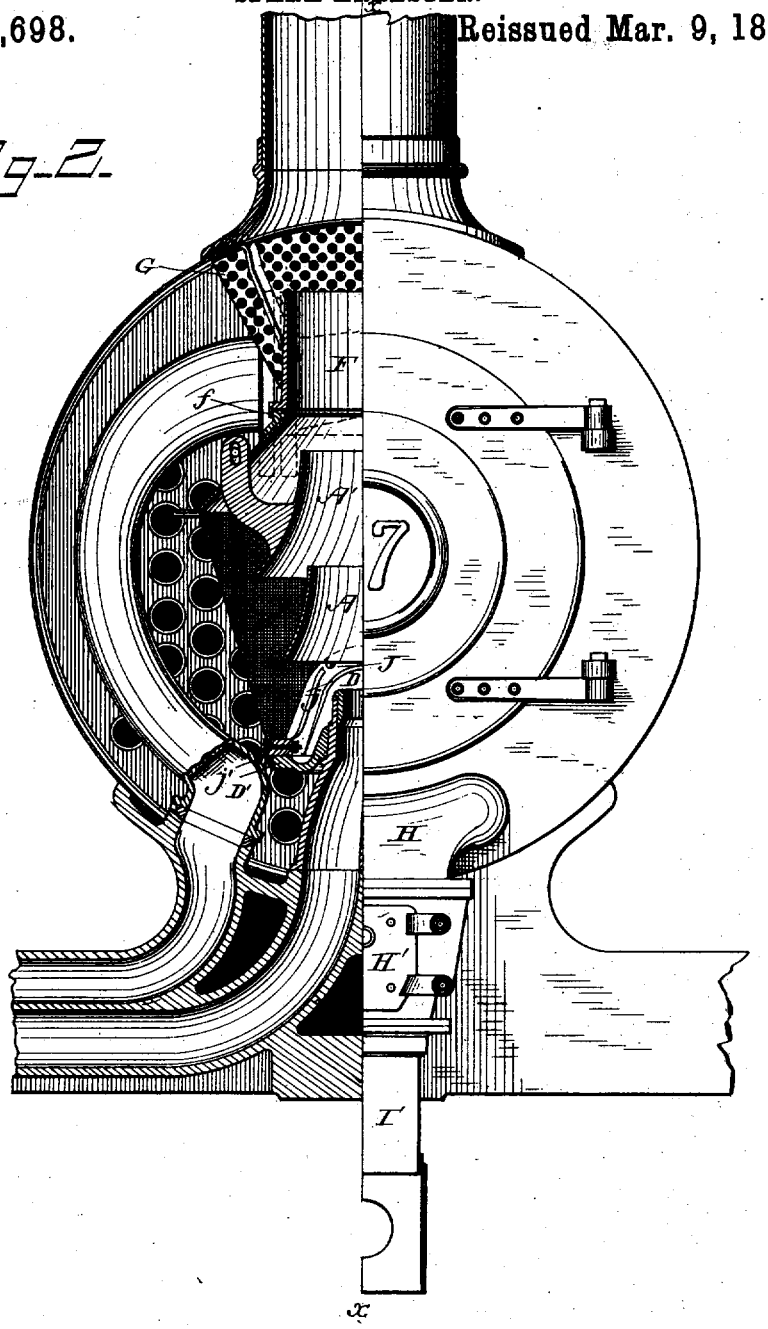

Figure 1 is a longitudinal section of my improved spark-arrester on the line *x x* in Fig. 2. Fig. 2 is a one-half cross-section on the line *x′ x′* in Fig. 1, and a front end view of the smoke-box.

Similar letters of reference indicate corresponding parts.

The invention is an improvement in the class of spark-arresters placed within the smoke-box of the locomotive.

The object of my invention is to construct a spark-arrester which shall be capable of being removed or withdrawn without disarranging the parts from the smoke-box, whereby access may be had to the flues. I also use a series of cone-shaped tube-sections which are caged within the spark-arresting screen, and are adapted to receive from the nozzle the exhaust-steam and to conduct it to the stack.

In order that the object of constructing the spark-arresting device or devices in such manner that they may be readily removed, in the manner above stated, from the smoke-box may be understood and appreciated, I desire to state that it is the custom to carry on locomotives what are called "plugs," (short tapering iron bars,) which are used to plug up the ends of the flues in case of leakage, and as this is done frequently while the engine is on a trip, (the train being delayed for a few moments for this purpose,) it is of prime importance that the spark-arresting devices be capable of ready removal, so as to give access to the flues.

The nature of said improvements I shall now proceed to describe more fully.

In the drawings hereto annexed, A A′ represent the series of cones to direct or form sufficient draft.

B is a netting or screen to prevent the sparks from coming in contact with the exhausted steam or from entering the stack, which is of any suitable construction—straight, if desired.

C is a brace, three (3) in all, secured to both top and bottom parts of the arrester, to which the netting is fastened, and thereby prevents the netting from warping.

D represents a sheet of metal, preferably cast, and which may be perforated or imperforated, the said sheet being riveted or otherwise united to a ring, D′, which has a bearing on the upper end of the exhaust-nozzle. Its location is such as to occupy the place where the netting is cut away for the purpose of passing the exhaust-nozzle during the operation of removing the spark-arresting devices from the smoke-box.

E is a shoulder-casting with hook-projections, which secure the arrester to the door E′, and a raised rim, *e*, extending one-half around said casting to guide and hold the arrester in place when the door is closing and closed.

E′ represents the smoke-box door, and is provided with recesses made solid with or fastened to the same for the casting E to hook or set in.

F is a casting supported solidly by three (3) braces riveted or made fast to it, said braces extending upward and fastened to the top of the smoke-box by bolts passing through the saddle supporting the stack, so that a part or parts of the arrester can be removed without interference.

G is a flaring perforated conical sheet or screen placed in the top of the smoke-box and supported with the casting F, to prevent the exhaust-steam raising the sparks to the top of the smoke-box and escaping, also to let the gases pass out readily.

H is an extension made on the front casting (on which the door E′ is supported) under the door as an outlet for the sparks from the smoke-box and for the support of the extinguisher H′.

H′ represents the extinguisher, fastened to the extension and connected with the exhaust-nozzle by a pipe, *h*, to convey a portion of the exhausted steam to extinguish the sparks before passing out, and as I send at the same time with this an application for patent on the extinguisher I think it not necessary to describe the extinguisher more fully in this specification.

I is a conveyer supported independently of the extinguisher and placed under the front truck, extending from the pipe I′ as far back as may prove best or desired in both freight and passenger engines. If extended under or beyond the fire-box, the ash-pan may be raised or sunken, as preferred, with a tapering casting on the front end and the back or other end cut away, as shown at I″, so the sparks may fall from the current of air passing through the conveyer, instead of being blown or lifted, as would be the case if dropped directly to the track from the pipe I′.

The casting F has a semicircular horizontal flange, *e′*, which overhangs the joint between the casting F and the casting E, to prevent sparks from entering said joint. It also has a semicircular vertical flange, *f*, which laps over the said joint and forms a continuation of the upwardly-extending flange *e* of the casting E, these two flanges thus forming a means for preventing the independent lateral vibration of these parts F and E, this tendency being caused by the motion of the engine. These flanges *f* and *e* are thus divided so as to allow the parts to be separated and the arrester to swing out readily from the smoke-box.

The casting J has a flange, *j*, which forms an abutment against which the sheet D fits. This flange also extends below the edge of the sheet, so as to form a lap-joint to prevent the entrance of sparks and aid in preventing lateral vibration of the lower end of the screen. This casting is also provided with another flange, *j′*, which extends partly around the casting, and which serves to guide and hold the lower end of the screen to its proper place.

The spark-arrester is constructed so as to admit of ready access to the boiler-tubes whenever it may be required, and a part swings outward when the door is opened and into place when closed.

The netting is fastened at the bottom of the arrester by a band placed around and fastened to the casting J, and the netting is bent around at the bottom of the said band, as shown.

I do not confine myself to the single exhaust-nozzle, as shown in drawings, for the double may be used with equal advantages.

Having thus described my invention, I claim and desire to secure by Letters Patent of the United States—

1. In a spark-arrester, the combination, with the exhaust-nozzle, of the devices located within the smoke-box for arresting the escape of cinders, and constructed so as to clear the nozzle and to be removable from the smoke-box without disarranging the parts thereof.

2. The combination, in a spark-arrester, of the cones A A′, screen B, braces C, and casting E, all constructed and arranged to operate substantially in the manner and for the purpose hereinbefore set forth.

3. The combination, in a spark-arrester, of the casting E, the raised rim *e*, and the smoke-box door E′, all constructed and arranged to operate substantially in the manner and for the purpose hereinbefore set forth.

4. The combination, in a spark-arrester, of the casting F, perforated sheet G, and braces supporting the same, constructed and arranged to operate substantially in the manner and for the purpose hereinbefore set forth.

5. The combination, in a spark-arrester, of the door E′, boiler-head, and smoke-box, and front casting, with extension H, substantially as and for the purpose hereinbefore set forth.

6. In a spark-arrester, the combination, with the door of the smoke-box, of spark-arresting devices secured thereto, located within said box, and capable of being removed by the opening of the door, substantially as described.

7. In a spark-arrester, the combination, with the smoke-box and its hinged outwardly-opening door, of the spark-arresting screen secured to the door and capable of being removed and returned by opening and closing the door, substantially as described.

8. In a spark-arrester, the combination, with the smoke-box door and the spark-arresting screen secured thereto, of the exhaust-nozzle, the conical pipe-sections, and the fixed screen in the upper part of the box, substantially as described.

9. In a spark-arrester, the combination of the casting F, having the semicircular downwardly-extending flange *f* and the semicircular horizontal flange *e′*, with the casting E, having the rim *e*, whereby sparks are prevented from entering the joint between the castings and independent lateral vibration of the parts prevented, substantially as described.

10. In a spark-arrester, the combination, with the frame J, having the flanges *j j′*, of the sheet D, fitting against the flange *j* and supported by a ring fitting over the nozzle, substantially as described.

In testimony whereof I affix my signature in presence of two witnesses.

GEORGE D. HUNTER.

Witnesses:

EDWIN L. BRADFORD,
CHAS. L. COOMBS.